(12) United States Patent
Schwarz et al.

(10) Patent No.: US 8,127,828 B2
(45) Date of Patent: Mar. 6, 2012

(54) AIR-OIL HEAT EXCHANGER

(75) Inventors: Frederick M. Schwarz, Glastonbury, CT (US); Frederick L. Elsaesser, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 993 days.

(21) Appl. No.: 11/378,166

(22) Filed: Mar. 17, 2006

(65) Prior Publication Data

US 2007/0215326 A1    Sep. 20, 2007

(51) Int. Cl.
F28F 27/00 (2006.01)
F28F 27/02 (2006.01)
F02K 3/02 (2006.01)
F02C 7/06 (2006.01)

(52) U.S. Cl. ........... 165/41; 165/44; 165/51; 165/86; 165/96; 60/226.1; 60/262; 60/266; 60/267; 60/39.08; 184/6.11

(58) Field of Classification Search ......... 165/41, 165/44, 51, 86, 96; 244/57; 60/226.1, 262, 60/266, 39.08, 267; 184/6.11
See application file for complete search history.

(56) References Cited

U.S. PATENT DOCUMENTS

| | | | | | |
|---|---|---|---|---|---|
| 1,549,202 | A | * | 8/1925 | McClane | 244/57 |
| 1,836,592 | A | * | 12/1931 | Hammond | 244/208 |
| 2,147,283 | A | * | 2/1939 | Covell | 165/86 |
| 2,249,948 | A | * | 7/1941 | Dornier | 244/57 |
| 2,291,607 | A | * | 8/1942 | Chausson | 236/35 |
| 2,295,115 | A | * | 9/1942 | Keller | 122/20 A |
| 2,305,897 | A | * | 12/1942 | Rauen | 74/665 B |
| 3,804,353 | A | * | 4/1974 | Scott et al. | 244/57 |
| 4,151,710 | A | * | 5/1979 | Griffin et al. | 60/39.08 |
| 5,082,049 | A | * | 1/1992 | Nekola | 165/277 |
| 5,269,135 | A | | 12/1993 | Vermejan et al. | |
| 6,587,862 | B1 | | 7/2003 | Henderson | |

FOREIGN PATENT DOCUMENTS

| EP | 0469825 A2 | | 2/1992 |
|---|---|---|---|
| JP | 10121127 A | * | 5/1998 |

OTHER PUBLICATIONS

Official Extended Search Report of the European Patent Office in foreign counterpart Application No. 07250975.5, filed Mar. 8, 2007.

* cited by examiner

*Primary Examiner* — John Ford
(74) *Attorney, Agent, or Firm* — Kinney & Lange, P.A.

(57) ABSTRACT

A heat exchange system for use in fluid operated equipment to provide air and working fluid heat exchanges to cool the working fluid in airstreams on a stream side of a wall. An actuator is mounted to be substantially located on a side of the wall opposite the stream side thereof having a positionable motion effector. A heat exchanger core having a plurality of passageway structures therein to enable providing the working fluid to, and removal therefrom. The heat exchanger core is mounted on the motion effector so as to be extendable and retractable thereby through the opening for selected distances into that region to be occupied by the airstreams.

15 Claims, 3 Drawing Sheets

US 8,127,828 B2

AIR-OIL HEAT EXCHANGER

BACKGROUND OF THE INVENTION

The present invention relates to lubrication systems for turbine engines and for associated equipment, and more particularly, to air and lubricant heat exchangers for use in maintaining desired temperatures of the lubricants in such engines and equipment.

Lubrication systems for turbine engines, such as a turbofan engine, and for associated equipment, such as an integrated drive generator, provide pressurized lubricant, an oil, to lubricate, cool and clean the engine main bearings, gear box gears, and the like, and again for the lubrication of bearings and other parts in equipment associated with such turbine engines. During such lubrications, heating of the lubricant is caused to occur due to mechanical energy losses in the lubricated apparatus. Thermal management of such lubricants is very important for continued successful operation of such lubrication systems in the apparatus lubricated thereby.

The amount of heat necessary to be ejected from lubricants in such systems is increasing because of the use of larger electrical generators, for instance, in aircraft turbine engines due to increasing consumption of electrical power in the aircraft powered thereby, and because of the advances in aircraft turbine engines such as the use of geared turbofans for such aircraft with a large fan-drive gearbox. Despite the added heat generated by the such modified and expanded equipment, the necessary lubricating oil operating temperature ranges to provide satisfactory lubricating performance have not changed for the most part and, in some instances, the upper operating temperature limits have been reduced.

The lubrication system for a turbofan engine in an aircraft typically has a first heat exchanger providing lubricating oil passing through passageways in that heat exchanger that is cooled by the fuel stream flowing past these passageways. This arrangement permits the lubricating oil to reject heat therein to the fuel in the aircraft thereby heating that fuel to help prevent the occurrence of icing therein. Because in some flight situations more heat is generated in the lubricating oil than is needed for warming the fuel, a portion of the lubricating oil can be forced to bypass the heat exchanger for the lubricating oil and the fuel and be directed to a further heat exchanger, where the heat therein is transferred to the air in the secondary airstream provided by the fan of the turbofan engine.

In a typical arrangement, a duct is provided in the fan cowling through which a portion of the airstream is diverted, and the air and lubricating oil heat exchanger is placed in this duct so that the lubricating oil passing through passageways in that heat exchanger is cooled by the duct airstream flowing past these passageways in the exchanger. If such additional cooling of the oil is not needed in a flight situation, the lubricating oil can again be forced to bypass this air and lubricating heat exchanger.

However, the fan airstream diverted to pass through the lubricating oil and air heat exchanger in such duct systems always flows through that exchanger. Further, the duct cross sectional area and the heat exchanger passageways exposure to the duct airstream must always be sufficiently large to assure sufficient heat transfer to the airstream in the most difficult flight conditions encountered, and so are much greater in size than what is required in the great majority of flight conditions. Thus, such an air and lubricating oil heat exchanger duct based system continually leads to thrust losses in the turbofan engine despite being unnecessary for cooling the lubricating oil in many flight situations. Hence, there is a strong desire for an air and lubricating oil heat exchanger system that reduces such thrust losses and also reduces the volume required therefor in the more compact spaces in advanced turbofan engines.

BRIEF SUMMARY OF THE INVENTION

The present invention provides a heat exchange system for use in operating equipment in which a working fluid is utilized in providing its operations with the heat exchange system providing air and working fluid heat exchanges to cool the working fluid at selectively variable rates in airstreams on a stream side of a wall provided with the equipment, and on which the equipment may be mounted. An actuator is mounted to be substantially located on a side of the wall opposite the stream side thereof having a positionable motion effector therein that can be moved to selected positions with respect to an opening in the wall. A heat exchanger core has a plurality of passageway are coupled to an input conduit at one end thereof and coupled to an output conduit at an opposite end thereof to enable providing the working fluid to, and removal from, interiors of the passageway structures through interiors of the input and output conduits. The heat exchanger core is mounted on the motion effector so as to be extendable thereby through the opening for selected distances into that region to be occupied by the airstreams on the stream side of the wall, and selectively retractable from those distances.

DETAILED DESCRIPTION

Figure 1:
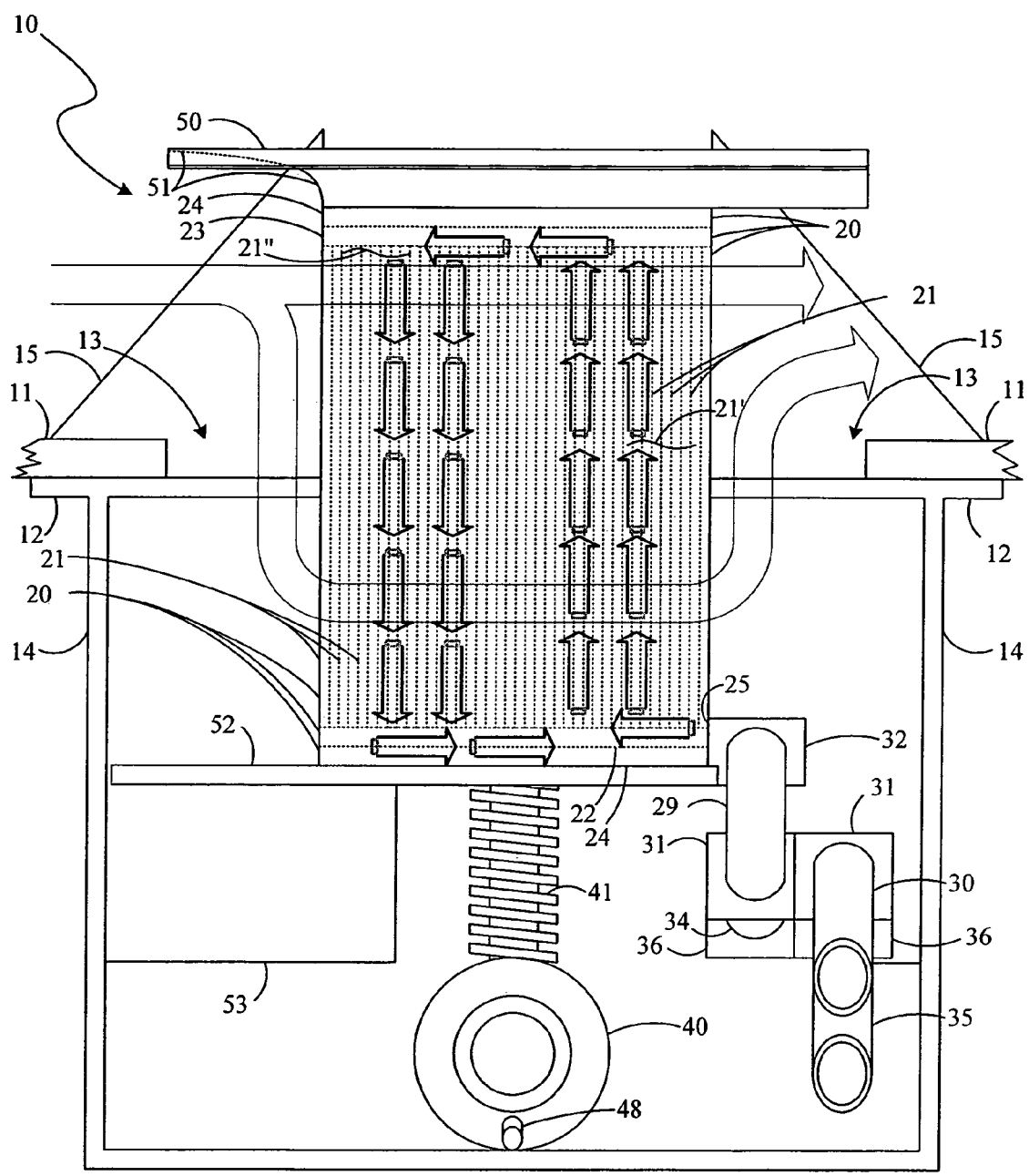
FIG. 1 shows a partially cut away side view of an embodiment of the present invention.
Figure 2:
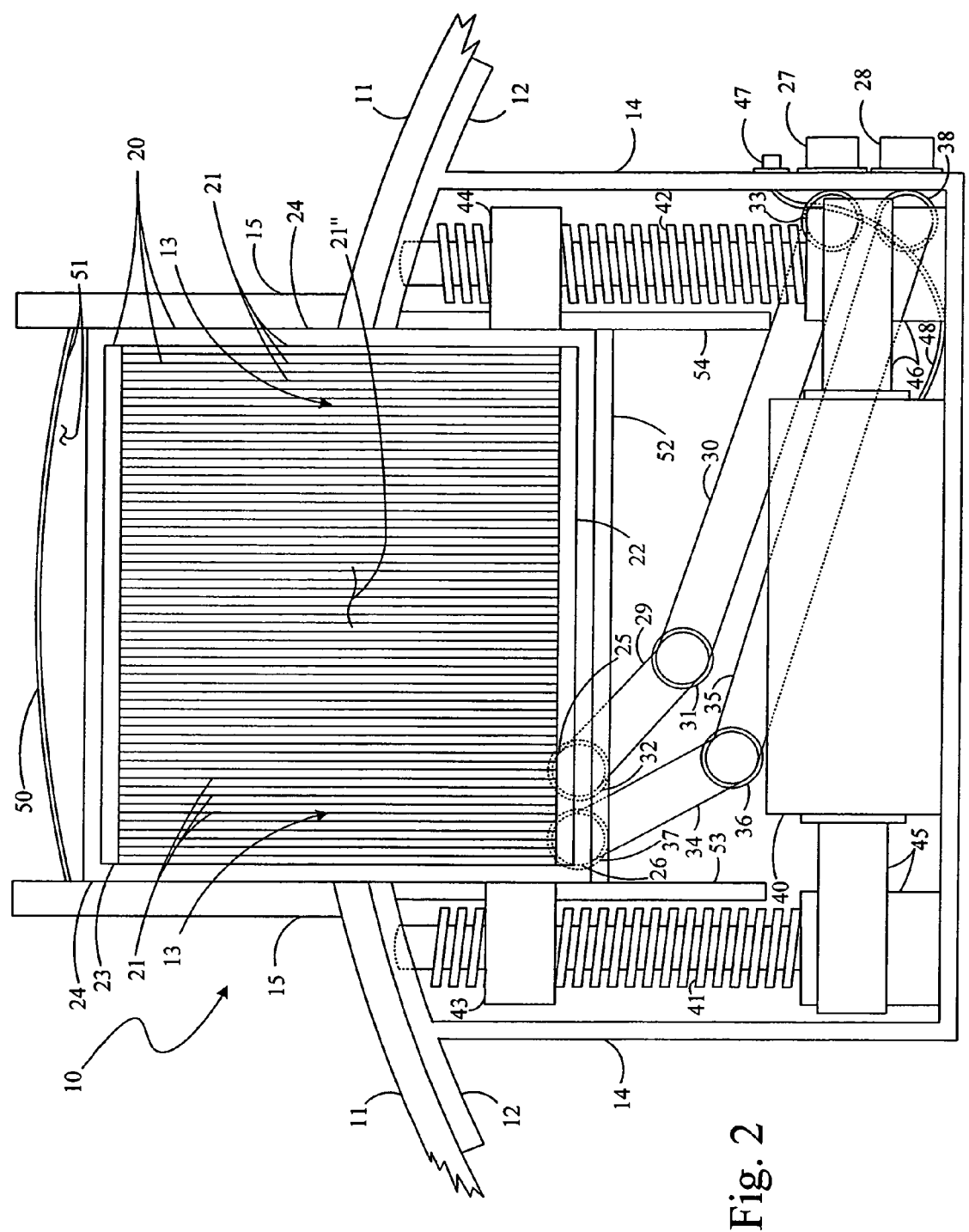
FIG. 2 shows a partially cut away front view of the embodiment of the present invention shown in FIG. 1.
Figure 3:
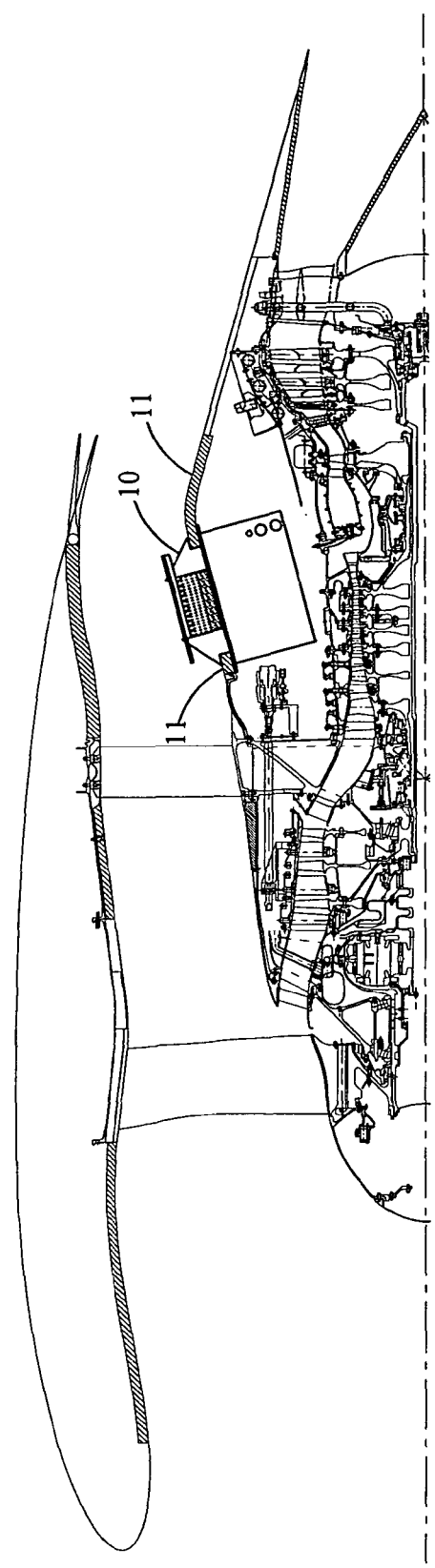
FIG. 3 shows a partial cut away side view of a turbofan engine illustrating positioning of air-oil heat exchanger 10 and inner fan duct wall 11.

FIGS. 1 and 2 show partially cut away side and front views, respectively, of a partially deployed air-oil heat exchanger, 10, mounted on a portion of an inner fan duct wall, 11, provided in a turbofan engine which is otherwise omitted from this figure. A flange, 12, holds heat exchanger 10 against the inner engine core side of wall 11 so that the deployable portion of heat exchanger 10 can be deployed in the engine fan airstream through an opening, 13, in wall 11 that is on the opposite side of that wall from the engine core side thereof. Flange 12 is part of a metal container, 14, for heat exchanger 10 provided on the engine core side of wall 11.

A further bracket, 15, located primarily on the airstream side of wall 11 and fastened to container 14 through opening 13 holds that container against wall 11. Bracket 15 has triangular shaped sidewalls across from one another with an opening therebetween to the interior of container 14 below that bracket on the upstream side of opening 13 on the left in FIG. 1, i.e. the front side of heat exchanger 10. Two further triangular shaped sidewalls are provided in bracket 15 across from one another with an opening therebetween to the interior of container 14 below on the downstream side of opening 13 on the right in FIG. 1. These two openings in bracket 15 permit a portion of the fan airstream to enter into the interior of container 14 on the upstream side and to exit from container 14 on the downstream side thereof whenever the deployable portion of heat exchanger 10 is at least partly deployed in the engine fan airstream through an opening 13. The triangular shaped sidewalls on the upstream side help guide that portion of the airstream into the interior of container 14 whenever the deployable portion of heat exchanger 10 is at least partly deployed in the engine fan airstream by limiting to an extent airflow around that deployed portion of heat exchanger 10.

The deployable portion of heat exchanger 10 is involves primarily a heat exchanger core, 20, having a substantial number of spaced apart passageway structures, 21, including air downstream passageway structures, 21', and air upstream passageway structures, 21", connected between two passageway end members including a lower passageway end member, 22, and an upper passageway end member, 23, held together by a frame, 24, so as to have access to the open interiors of these passageway structures from the open interiors of corresponding channels in the passageway end members. Thus, the open interiors of air downstream passageway structures 21', at the upper ends thereof in the figures, are joined to the open interiors of air upstream passageway structures 21", at the upper ends thereof in the figures, by appropriate channels provided in upper passageway end member 23 so that the working fluid, or oil, passing through air downstream passageway structures 21' can next pass through air upstream passageway structures 21".

The open interiors of air downstream passageway structures 21' at the opposite, lower ends thereof are joined to the open interior of core oil inlet connector stub, 25, by channels in lower passageway end member 22. Similarly, the open interiors of air upstream passageway structures 21" at the opposite, lower ends thereof are joined to the open interior of core oil outlet connector stub, 26, as seen in FIG. 2, by other channels in lower passageway end member 22. Thus, if heat exchanger core 20 is exposed to the engine fan airstream, that air will pass between passageway structures 21, first through air upstream passageway structures 21" positioned toward the front, or upstream side, of heat exchanger 10, and then through air downstream passageway structures 21' positioned toward the rear of heat exchanger 10. Oil will enter heat exchanger core 20 through core oil inlet connector stub 25 to pass lower passageway end member 22 as shown by the bolded block arrow pointing to the left in FIG. 1 therefrom at the bottom of core 20. Connections to air downstream passageway structures 21' results in the oil at the greatest temperatures then passing first through air downstream passageway structures 21' in core heat exchanger 20 to be cooled and then reach upper passageway end member 23 as shown by the bolded block arrows on the right pointing upward, and then the two pointing leftward at the top of the core, in FIG. 1.

This oil then next passes through air upstream passageway structures 21" connected to upper passageway end member 23 to be further cooled as shown by the bolded block arrows on the left pointing downward, to reach lower passageway end member 22. The cooled oil then exits heat exchanger core 20 via core oil outlet connector stub 26, seen only in FIG. 2, as shown by the bolded block arrows pointing to the right in FIG. 1 at the bottom of core 20. These flow and position arrangements for the oil and air flows assures that there is always a positive transfer of heat from the oil to the airstream at both air downstream passageway structures 21' and the air upstream passageway structures 21".

The oil from the turbofan engine lubrication system, or the integrated drive generator lubrication system, or the fluid from the lubrication or other working fluid systems in other equipment, reaches heat exchanger core 20 therefrom through interconnections from tubing or piping in such systems that are typically removably interconnected to an exchanger oil inlet connector stub, 27, seen in FIG. 2, mounted on the side of container 14 of heat exchanger 10. Such oil or working fluid is returned to such systems from heat exchanger 10 through an exchanger oil outlet connector stub, 28, also mounted on frame 14 of heat exchanger 10 as seen in FIG. 2.

One arrangement for connecting exchanger oil inlet connector stub 27 on frame 14 to core oil inlet connector stub 25 on heat exchanger core 20 is shown in FIGS. 1 and 2 using two tube or hose sections, 29 and 30, which are joined to one another by a swivel coupling, 31. Section 29 is joined with core oil inlet connector stub 25 by another swivel coupling, 32, and section 30 is joined with exchanger oil inlet connector stub 27 by a further swivel coupling, 33. These swivel couplings each have two sections both having an outer wall about an open space within open to that of the other, and with these sections being connected to each other so as to allow them to rotate with respect to one another. Each of these sections has a corresponding fitting providing an opening therethrough to the space within that allows each section to be connected to a corresponding external conduit for transferring fluid to and from the interior space thereof.

Similarly, an arrangement for connecting exchanger oil outlet connector stub 28 on the same side of container 14 to core oil outlet connector stub 26 on heat exchanger core 20 is shown in FIGS. 1 and 2 also uses two tube or hose sections, 34 and 35, which are joined to one another by a swivel coupling, 36. Section 34 is joined with core oil outlet connector stub 26 by another swivel coupling, 37, and section 35 is joined with exchanger oil outlet connector stub 28 by yet another swivel coupling, 38. Alternatively, the two tube or hose sections with swivel couplings could have flexible hoses and clamped slip-on couplings substituted therefor, or some other flexible conduit arrangement could alternatively be used.

Heat exchanger core 20 can be selectively deployed in selected frontal area fraction thereof for a turbofan engine in the engine fan airstream above wall 11, in the figures, using alternatively an electrical, hydraulic or pneumatic motor, 40, (an electric motor being shown in FIGS. 1 and 2) to raise a platform upon which core 20 is mounted or, as alternatively shown in FIGS. 1 and 2, to rotate threaded jackscrews, 41 and 42, engaged with threaded nuts, 43 and 44, mounted directly across from one another on the opposite sides of core frame 24. A gearbox, 45, has one end of the rotor shaft (unseen in the figures) of motor 40 extending therein to engage suitable gearing (unseen in the figures) to rotate jackscrew 41 in response to the rotation of that rotor shaft within attached core frame nut 43. Similarly, a gearbox, 46, has the other end of the rotor shaft (unseen in the figures) of motor 40 extending therein to engage suitable gearing (unseen in the figures) to rotate jackscrew 42 in response to the rotation of that rotor shaft within attached core frame nut 44.

In this arrangement, rotation of the motor rotor shaft in one direction results in raising heat exchanger core 20 toward and into the fan engine airstream above wall 11 in the figures a selected distance depending on the amount of shaft rotation. In the same manner, rotation of that shaft in the opposite direction results in lowering core 20 toward and back into the fan engine compartment a selected distance again depending on the amount of shaft rotation in this opposite direction. The electrical power to cause selected rotations of the rotor shaft of motor 40 is selectively supplied to an electrical connector, 47, mounted on the side of container 14 to which an electrical wiring cable, 48, extending from motor 40, is connected.

Heat exchanger core 20, when fully retracted into container 14, to a significant degree seals the engine compartment on the lower side of wall 11 in the figures from the engine fan airstream above that wall. A core cover, 50, formed of materials similar to that used in providing wall 11, is provided affixed to the top of core frame 24 to achieve this degree of sealing. The outer surface of core cover 50 is shaped to be flush with, and to conform to the curvatures and contours of, the adjacent surface contours of wall 11. Thus, the outer surface of the engine compartment, with heat exchanger 10 mounted within this compartment, is presented to the engine fan airstream as a smooth surface when core 20 is fully retracted into container 14 except for the narrow edges of the triangular shaped sidewalls of bracket 15 facing the airstream. This configuration with core 20 being fully retracted thereby minimizes any airstream disturbance in conditions in which heat exchanger 10 is not being used to cool oil flowing through it from exchanger oil inlet connector stub 27 to exchanger oil outlet connector stub 28.

The upstream side of core cover 50, however, has a sculpted front to form a front inner surface, 51, facing the engine fan airstream when core 20 is deployed to some extent in that airstream. Front inner surface 51 follows the contour of the outer surface of core cover 50 extending right and left as seen in FIG. 2, and begins at the upstream front edge of core cover 50 paralleling that outer surface thereof but then curves downward toward the engine compartment as seen in FIG. 1. Such a downward curving front inner surface directs a portion of the engine fan airstream downward through the upstream opening in bracket 15 into container 14 so that part of it passes more or less straight through the part of core 20 directly exposed to this airstream when that core is deployed to some extent therein. The remaining part of this airstream portion directed into container 14 passes through the part of core 20 that is still within container 14. After passing through core 20, the diverted portion thereof flows out of container 14 through the downstream opening in bracket 15 to rejoin the engine fan airstream. These flow paths of the portion of engine fan airstream when core 20 is partially deployed in that airstream are indicated by the light line extended block arrows drawn through core 20 in FIG. 1.

Thus, the entirety of passageway structures 21 in heat exchanger core 20 are subjected to the diverted airstream portion in varying degree to cool the oil flowing through those passageways upon any deployment of that core in the airstream, and not just the core part directly exposed to that airstream because of the deployment. As a result, there will need to be less of core 20 deployed into the engine fan airstream than there would be if only the directly exposed part thereof provided cooling of the oil flowing in that core.

The diverted airstream portion is further confined to pass through the entirety of passageway structures 21 in heat exchanger core 20 by, first, a baffle, 52, seen FIG. 1 that is attached to the bottom of heat exchanger core 20 and extends outward therefrom toward the upstream direction. Baffle 52 substantially closes off the portion of the interior volume of container 14 (across from air upstream passageway structures 21", between those structures and the facing wall of that container) from the volume of container 14 below core 20 on the upstream side of that container at whatever degree of deployment of core 20 has occurred. In addition, a pair of sidewalls, 53 and 54, mounted in container 14 on either side of heat exchanger core 20 substantially closes the sides of that same interior volume across from air upstream passageway structures 21" so that the incoming diverted portion of the engine fan airstream is substantially directed toward air upstream passageway structures 21". As a result, maximum cooling of the oil flowing in these structures is obtained from the diverted airstream portion substantially confined by baffle 52 and sidewalls 53 and 54 to pass by these structures.

Typically, heat exchanger 10 will be provided in fluid operated equipment system, such as the lubrication system for a turbofan engine, that is supplemented by an electrical control system directing operations of that equipment system and its components. Often, this will involve a feedback control loop using a temperature sensor to measure the temperature of the working fluid, such as oil in a lubrication system, and the sensor signal will be used by the controller in the control loop to control the cooling of that working fluid. Thus, such a control loop can be used to selectively direct electrical power to electrical connector 47 of heat exchanger 10, and so to motor 40 therein, to control the extent of deployment of heat exchanger core 20 into the engine fan airstream to control the rate of cooling of the oil flowing through passageway structures 21 in that core. Because of thermal change delays in achieving fluid temperature changes, rather than a simple feedback control loop being used for controlling heat exchanger 10, there may further aspects to the operation of the controller in such a loop, such as the controller relying also on lookup tables obtained from past experience, as to what degree of deployment of core 20 should be selected in any rising fluid temperature situation.

Although the present invention has been described with reference to preferred embodiments, workers skilled in the art will recognize that changes may be made in form and detail without departing from the spirit and scope of the invention.

The invention claimed is:

1. A heat exchange system for use in operating equipment in which a working fluid is utilized in providing selected operations thereof, the heat exchange system for providing air and working fluid heat exchanges to cool the working fluid at selectively variable rates in airstreams occurring on a stream side of a wall provided with the equipment, the system comprising:

an actuator mounted to be substantially located on a side of the wall opposite the stream side and having a positionable motion effector therein that can be moved to selected positions with respect to an opening in the wall;

a heat exchanger core having a plurality of passageway structures therein about which air can pass in flowing therethrough with the passageway structures being coupled to an input conduit at one end thereof and coupled to an output conduit at an opposite end thereof to enable the working fluid to be provided, and removed from, interiors of the passageway structures through interiors of the input and output conduits, the heat exchanger core being mounted on the motion effector so as to be extendable thereby through the opening for selected distances into that region to be occupied by the airstreams on the stream side of the wall, and selectively retractable from those distances, wherein the heat exchanger core has a closing structure thereon, and wherein the closing structure has an end facing a direction opposite that direction primarily followed by the airstreams in the region to be occupied thereby having a surface beginning thereat substantially parallel to the wall with sufficient convexity inwardly from the end to become oriented substantially perpendicular to the wall; and a container mounted to be substantially located on the side of the wall opposite the stream side so as to surround the opening and having an interior within which the actuator is positioned and from which interior the heat exchanger core is extendable through the opening so as to leave a portion thereof in the container that is at least in part spaced apart from the container, and into which interior the heat exchanger core is retractable through the opening so as to result in excluding the airstreams from the interior if retracted sufficiently.

2. The system of claim 1 wherein the heat exchanger core is out of the region to be occupied by the airstreams if the heat exchanger core is in an unextended position and with the closing structure then substantially blocking the opening, and in the region to be occupied by the airstreams at least in part if the heat exchanger core is in an extended position.

3. The system of claim 1 wherein the actuator comprises a motor rotating a jackscrew within a threaded nut affixed to a side of the heat exchanger core.

4. The system of claim 1 wherein an input portion of the plurality of passageway structures are coupled to the input conduit at one end thereof and an output portion of the plurality of passageway structures are coupled to the output conduit at one end thereof, the input portions and the output portions of the plurality of passageway structures being coupled to corresponding ones of each other at opposite ends thereof.

5. The system of claim 2 wherein the interior of the container is substantially closed from the region to be occupied by the airstreams if the heat exchanger core is in an unextended position by the closing structure on the heat exchanger core substantially blocking the opening so as to have an outer surface thereof flush with, and following contours of, adjacent portions of that surface of the wall on the stream side thereof.

6. The system of claim 2 further comprising a pair of sidewalls provided substantially perpendicular to the wall and extending along opposite sides of the heat exchanger core substantially parallel to that direction primarily followed by the airstreams in the region to be occupied thereby.

7. The system of claim 2 further comprising a baffle coupled to the heat exchanger core on a side thereof opposite the closing structure and extending in a direction opposite that direction primarily followed by the airstreams in the region to be occupied thereby such that the baffle substantially seals that portion of the interior on one side of the heat exchanger core from that portion of the interior on an opposite side of the baffle.

8. The system of claim 5 further comprising an container inlet and container outlet provided through a side of the container, and a core inlet and a core outlet provided on the heat exchanger core having the open interior passageways in the heat exchanger core connected therebetween, the container inlet and the core inlet being coupled by a flexible conduit with the container outlet and the core outlet also being coupled by a another flexible conduit such that the working fluid can be caused to enter the container inlet and to pass through the core inlet, the open interior passageways, the core outlet and the container outlet, the flexible conduits flexing sufficiently to remain so coupled following extensions and retractions of the heat exchange core.

9. The system of claim 5 further comprising a pair of sidewalls mounted in the container provided substantially perpendicular to the wall and extending along opposite sides of the heat exchanger core substantially parallel to that direction primarily followed by the airstreams in the region to be occupied thereby.

10. The system of claim 5 further comprising a baffle in the interior of the container coupled to the heat exchanger core on a side thereof opposite the closing structure and extending nearly to a side of the container in a direction opposite that direction primarily followed by the airstreams in said region to be occupied thereby such that the baffle substantially seals that portion of the interior on one side of the heat exchanger core from that portion of the interior on an opposite side of the baffle.

11. The system of claim 9 further comprising a baffle in the interior of the container coupled to the heat exchanger core on a side thereof opposite the closing structure and extending nearly to a side of the container in a direction opposite that direction primarily followed by the airstreams in the region to be occupied thereby such that the baffle substantially seals that portion of the interior on one side of the heat exchanger core from that portion of the interior on an opposite side of the baffle.

12. A heat exchange system for use in lubricating systems for aircraft turbofan engine equipment in which a lubricant is provided under pressure to spaces bounded at least in part by surfaces moving relative to one another, the heat exchange system for providing air and lubricant heat exchanges to cool the lubricant at selectively variable rates in airstreams occurring on a stream side of an engine fan duct wall, the system comprising:

a controllable motor having a shaft with a selectable angular position with the motor being mounted to be substantially located on a side of the wall opposite the stream side and having a positionable motion effector coupled to the shaft that can be moved to selected positions with respect to an opening in the wall by selected rotations of the shaft; and a heat exchanger core having a closing structure thereon and having a plurality of passageway structures therein about which air can pass in flowing therethrough with the passageway structures being coupled to an input conduit at one end thereof and coupled to an output conduit at an opposite end thereof to enable the lubricant to be provided, and removed from, interiors of the passageway structures through interiors of the input and output conduits, the heat exchanger core being mounted on the motion effector so as to be extendable thereby through the opening for selected distances into that region to be occupied by the airstreams on the stream side of the wall in an extended position, and selectively retractable from those distances including retracted sufficiently to be out of the region to be occupied by the airstreams if the heat exchanger core is in an unextended position such that the closing structure on the heat exchanger core substantially blocks the opening, the closing structure having an end facing a direction opposite that direction primarily followed by the airstreams in the region to be occupied thereby that has a surface beginning thereat substantially parallel to the wall with sufficient convexity inwardly from the end to become oriented substantially perpendicular to the wall.

13. The system of claim 12 wherein the closing structure on the heat exchanger core substantially blocks the opening so as to have an outer surface thereof flush with, and following contours of, adjacent portions of that surface of the wall on the stream side thereof.

14. The system of claim 12 further comprising a container having an interior within which the motor and the heat exchanger core are provided at least in part, and in which a pair of sidewalls mounted in the container are provided substantially perpendicular to the wall and which extend along opposite sides of the heat exchanger core substantially parallel to that direction primarily followed by the airstreams in the region to be occupied thereby.

15. The system of claim 12 further comprising a container having an interior within which the motor and the heat exchanger core are provided at least in part, and in which a baffle is provided in the interior of the container coupled to the heat exchanger core on a side thereof opposite the closing structure and extending nearly to a side of the container in a direction opposite that direction primarily followed by the airstreams in said region to be occupied thereby such that the baffle substantially seals that portion of the interior on one side of the heat exchanger core from that portion of the interior on an opposite side of the baffle.

* * * * *